United States Patent
Lee

(10) Patent No.: US 11,899,951 B2
(45) Date of Patent: Feb. 13, 2024

(54) ERROR RESTORING METHOD, MICROCONTROLLER UNIT USING THE SAME, AND BATTERY DEVICE INCLUDING THE MICROCONTROLLER UNIT

(71) Applicant: LG CHEM, LTD., Seoul (KR)

(72) Inventor: Hojoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 343 days.

(21) Appl. No.: 17/279,862

(22) PCT Filed: Jan. 10, 2020

(86) PCT No.: PCT/KR2020/000511
§ 371 (c)(1),
(2) Date: Mar. 25, 2021

(87) PCT Pub. No.: WO2020/145742
PCT Pub. Date: Jul. 16, 2020

(65) Prior Publication Data
US 2022/0035545 A1    Feb. 3, 2022

(30) Foreign Application Priority Data
Jan. 11, 2019 (KR) .......................... 10-2019-0003998

(51) Int. Cl.
*G06F 11/00* (2006.01)
*G06F 3/06* (2006.01)
(Continued)

(52) U.S. Cl.
CPC .......... *G06F 3/0634* (2013.01); *G06F 3/0679* (2013.01); *G06F 11/0706* (2013.01);
(Continued)

(58) Field of Classification Search
CPC .... G06F 3/0629; G06F 3/0634; G06F 3/0679; G06F 11/0703; G06F 11/0706;
(Continued)

(56) References Cited

U.S. PATENT DOCUMENTS 8,589,730 B2    11/2013  Byom et al.
8,966,168 B2    2/2015   Hanafusa
(Continued)

FOREIGN PATENT DOCUMENTS

JP    2011-83147 A     4/2011
JP    2011-164827 A    8/2011
(Continued)

OTHER PUBLICATIONS

Extended European Search Report dated Nov. 11, 2021, of the corresponding European Patent Application No. 20738932.1.
(Continued)

*Primary Examiner* — Anthony J Amoroso
(74) *Attorney, Agent, or Firm* — Birch, Stewart, Kolasch & Birch, LLP

(57) ABSTRACT

A micro controller unit (MCU) includes a flash memory, wherein the flash memory determines a key value of an application when the MCU is powered on, and, when the key value of the application is invalid, the flash memory enters a mode that enables reprogramming of the flash memory.

11 Claims, 3 Drawing Sheets

(51) Int. Cl.
  *G06F 11/07* (2006.01)
  *G06F 11/14* (2006.01)
  *H02J 7/00* (2006.01)
  *H02J 9/00* (2006.01)

(52) U.S. Cl.
  CPC ...... *G06F 11/0751* (2013.01); *G06F 11/0793* (2013.01); *G06F 11/1417* (2013.01); *H02J 7/0063* (2013.01); *H02J 9/002* (2013.01)

(58) Field of Classification Search
  CPC ............... G06F 11/0727; G06F 11/073; G06F 11/0751; G06F 11/0793; G06F 11/1417; G06F 11/142; G06F 11/1666; H02J 7/0063; H02J 9/002
  See application file for complete search history.

(56) References Cited

U.S. PATENT DOCUMENTS

| | | | |
|---|---|---|---|
| 9,280,654 | B1* | 3/2016 | Peterson ............. H02J 7/00712 |
| 2002/0126528 | A1 | 9/2002 | Conley et al. |
| 2003/0174555 | A1 | 9/2003 | Conley et al. |
| 2004/0078119 | A1* | 4/2004 | Luitje ....................... G06F 8/60 701/1 |
| 2005/0195653 | A1 | 9/2005 | Conley et al. |
| 2007/0109858 | A1 | 5/2007 | Conley et al. |
| 2008/0086631 | A1 | 4/2008 | Chow et al. |
| 2009/0199048 | A1 | 8/2009 | Aralakuppe Ramegowda et al. |
| 2012/0054541 | A1 | 3/2012 | Byom et al. |
| 2013/0055046 | A1 | 2/2013 | Blodgett |
| 2014/0310698 | A1 | 10/2014 | Lee et al. |
| 2015/0067314 | A1 | 3/2015 | Strauss et al. |
| 2016/0019974 | A1 | 1/2016 | Blodgett |
| 2017/0024221 | A1* | 1/2017 | He ....................... G06F 9/4403 |
| 2017/0352429 | A1 | 12/2017 | Blodgett |

FOREIGN PATENT DOCUMENTS

| | | |
|---|---|---|
| JP | 5597224 B2 | 10/2014 |
| JP | 2016-81341 A | 5/2016 |
| KR | 10-2003-0068202 A | 8/2003 |
| KR | 10-2012-0021210 A | 3/2012 |
| KR | 10-2012-0024906 A | 3/2012 |
| KR | 10-2014-0059821 A | 6/2014 |
| KR | 10-2014-0123143 A | 10/2014 |
| KR | 10-2016-0144762 A | 12/2016 |
| KR | 10-1692839 B1 | 1/2017 |
| KR | 10-1744998 B1 | 6/2017 |

OTHER PUBLICATIONS

International Search Report (PCT/ISA/210) issued in PCT/KR2020/000511, dated Apr. 28, 2020.

* cited by examiner

ERROR RESTORING METHOD, MICROCONTROLLER UNIT USING THE SAME, AND BATTERY DEVICE INCLUDING THE MICROCONTROLLER UNIT

CROSS-REFERENCE TO RELATED APPLICATION

This application claims priority to and the benefit of Korean Patent Application No. 10-2019-0003998 filed in the Korean Intellectual Property Office on Jan. 11, 2019, the entire contents of which are incorporated herein by reference.

TECHNICAL FIELD

The present disclosure relates to an error restoring method, a microcontroller unit using the error restoring method, and a battery device including the microcontroller.

BACKGROUND ART

When an application key is erased or written, unexpected power off may occur, thereby causing damage to a memory. Then, a CPU core exception occurs due to an error correction code (ECC) error, which occurs when reading an application key later, such that software reset occurs.

Thus, infinite repetition between the initial power on and the process of reading the application key area occurs to confirm a valid key. Then, both the application and a flash bootloader (FBL) are in a situation where they have not been executed.

DISCLOSURE

Technical Problem

An error restoring method of a flash memory, a micro controller unit using the error restoring method of the flash memory, and a battery device including the micro controller unit can be provided.

Technical Solution

A micro controller unit (MCU) according to an aspect of the present invention includes a flash memory, wherein the flash memory may be configured to determine a key value of an application stored in the flash memory when the MCU is powered on, and, when the key value of the application is invalid, the flash memory may enter a mode that enables reprogramming of the flash memory.

The flash memory may include a flash boot loader (FBL), an application block, and an application key block, when the MCU is powered on the flash boot loader may be configured to determine the application key value in the application key block, and, the mode that enables reprogramming is a flash boot loader mode.

The application block may be configured to reprogram received application data in the flash boot loader mode.

The application block may be configured to write a valid application key value after completion of the reprogramming.

The flash memory may be configured to, when receiving a reprograming request, erase a key value of an application that corresponds to the reprograming request, and may enter the mode.

The flash memory may be configured to reprogram received application data and may be configured to write an application key value in the mode.

According to another aspect of the present invention, an error restoring method of a microcontroller unit (MCU) that includes a flash memory, the flash memory including a flash boot loader, an application block, and an application key block is provided. The error restoring method includes: when the MCU is powered on, determining, by the flash boot loader, an application key value in the application key block; and when the application key value is invalid in the determining the application key value, staying in the flash boot loader for enabling reprogramming of the flash memory.

The error restoring method of the MCU may further include, reprogramming received application data and writing a valid application key value after completion of the reprogramming.

The error restoring method of the MCU may further include: in the determining the application key value, executing a corresponding application when the application key value is valid; receiving a reprogramming request during execution of the corresponding application; and erasing a key value of the corresponding application when receiving the reprogramming request.

After erasing the application key value, the error restoring method may be performed from the determining of the application key value in the application key block, by the flash boot loader.

A battery device according to another aspect of the present invention includes: a battery cell assembly that includes a plurality of battery cells that are electrically connected to each other, a micro controller unit (MCU) that includes a flash memory, the flash memory being configured to store an application for battery management of the battery cell assembly; and a battery management system that performs the battery management according to the application executed by the MCU. When the MCU is powered on, the flash memory may be configured to determine a key value of the application, and when the key value of the application is invalid, the flash memory may be configured to enter a mode that enables reprogramming of the flash memory.

Advantageous Effects

An error restoring method of a flash memory, a micro controller unit using the error restoring method of the flash memory, and a battery device including the micro controller unit may be provided.

MODE FOR INVENTION

Figure 1:
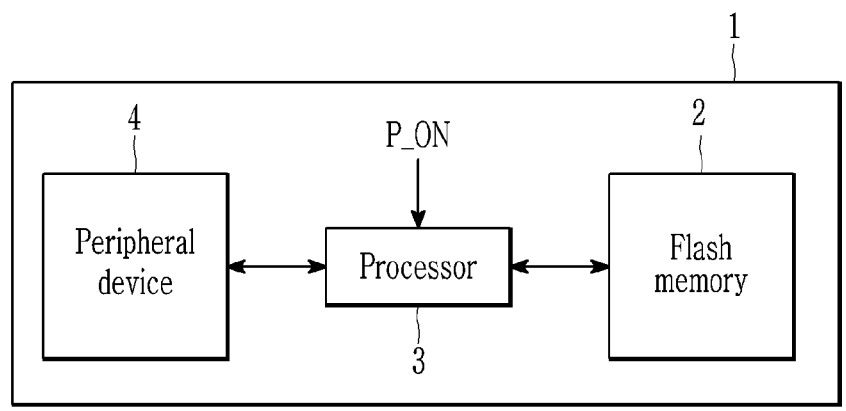
FIG. 1 shows a microcontroller unit according to an exemplary embodiment.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a microcontroller unit according to an exemplary embodiment.

As shown in FIG. 1, a microcontroller unit (MCU) 1 includes a flash memory 2, a processor 3, and a peripheral device 4.

The flash memory 2 stores an application that is required by a device to which the MCU 1 is applied, executes software of the application, reprograms the corresponding software when reprogramming is requested, and deletes and resets an application key area when a CPU core exception occurs due to an ECC error and the error has occurred in the key application area such that the flash memory 2 may operate in a state of being capable of reprogramming.

The processor 3 may transmit information input through the peripheral device 4 to the flash memory 2 while networking with the flash memory 2 and the peripheral device 4 through an interface, and may transmit commands to control operations of the flash memory 2 and the peripheral device 4. When the MCU 1 is powered on, a power-on signal P_ON is input to the processor 3, and the processor 3 transmits commands for execution of an application to the flash memory 2.

The peripheral device 4 includes a communication module for CAN communication, UART communication, and the like, and transmits a reprogramming request and software codes for reprogramming to the processor 3.

Hereinafter, referring to FIG. 2, the flash memory according to the exemplary embodiment will be described.

Figure 2:
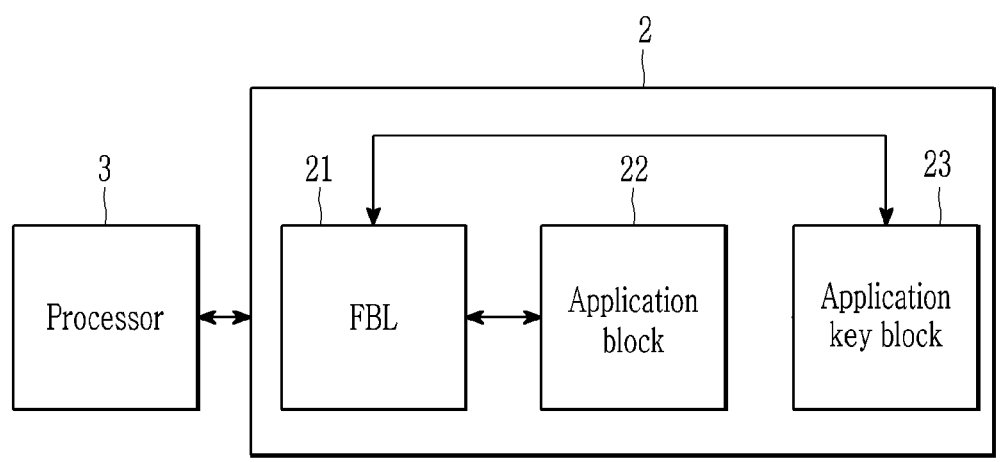
FIG. 2 shows a configuration of the flash memory according to the exemplary embodiment.

FIG. 2 shows a configuration of the flash memory 2 according to the exemplary embodiment.

As shown in FIG. 2, the flash memory 2 includes a flash bootloader (FBL) 21, an application block 22, and an application key block 23.

In an FBL mode where commands stay in the FBL 21, the FBL 21 may erase software in an application area of the flash memory 2 and perform reprogramming. The FBL 21 may determine whether a key value of the application is valid according to the command transmitted from the processor 3. When the key value of the application is not valid according to a determination result of the FBL 21, the application of the application block 22 is not executed, and the flash memory 2 enters the FBL mode.

The FBL 21 may inform the processor 3 that the application key value is invalid.

When it is determined that a key value of the corresponding application is valid by the FBL 21, the application block 22 can operate the software stored in the application area according to a command. When a reprogramming request is transmitted to the flash memory 2 from the processor 3 during operation, the application key block 23 erases and resets an application key area corresponding to the active application, and then the flash memory 2 enters the FBL mode.

As described, when an application key value is invalid or reprogramming is requested, the flash memory 2 enters the FBL mode where the command stays in the FBL 21 for reprogramming.

The FBL 21 receives data with respect to an application corresponding to a command from the peripheral device 4 through CAN communication or UART communication, and performs reprogramming of the received data in the application block 22 area. After the received data is written into the application area through reprogramming, the application key block 23 writes a valid key value into an area corresponding to the application. After the writing, the application key block 23 performs reset, and the application block 22 may perform a reprogrammed application through the corresponding reset.

In addition to the above operation, when the CPU core exception due to the ECC error occurs, the FBL 21 erases and resets the application key value when the ECC error is generated in the application key block 23 such that the flash memory 2 enters the FBL mode. That is, the flash memory 2 enters the FBL mode, which is restored to a state that reprogramming is possible.

In order to perform the above-stated operation, the FBL 21, the application block 22, and the application key block 23 may transmit and receive necessary information to and from each other.

Figure 3:
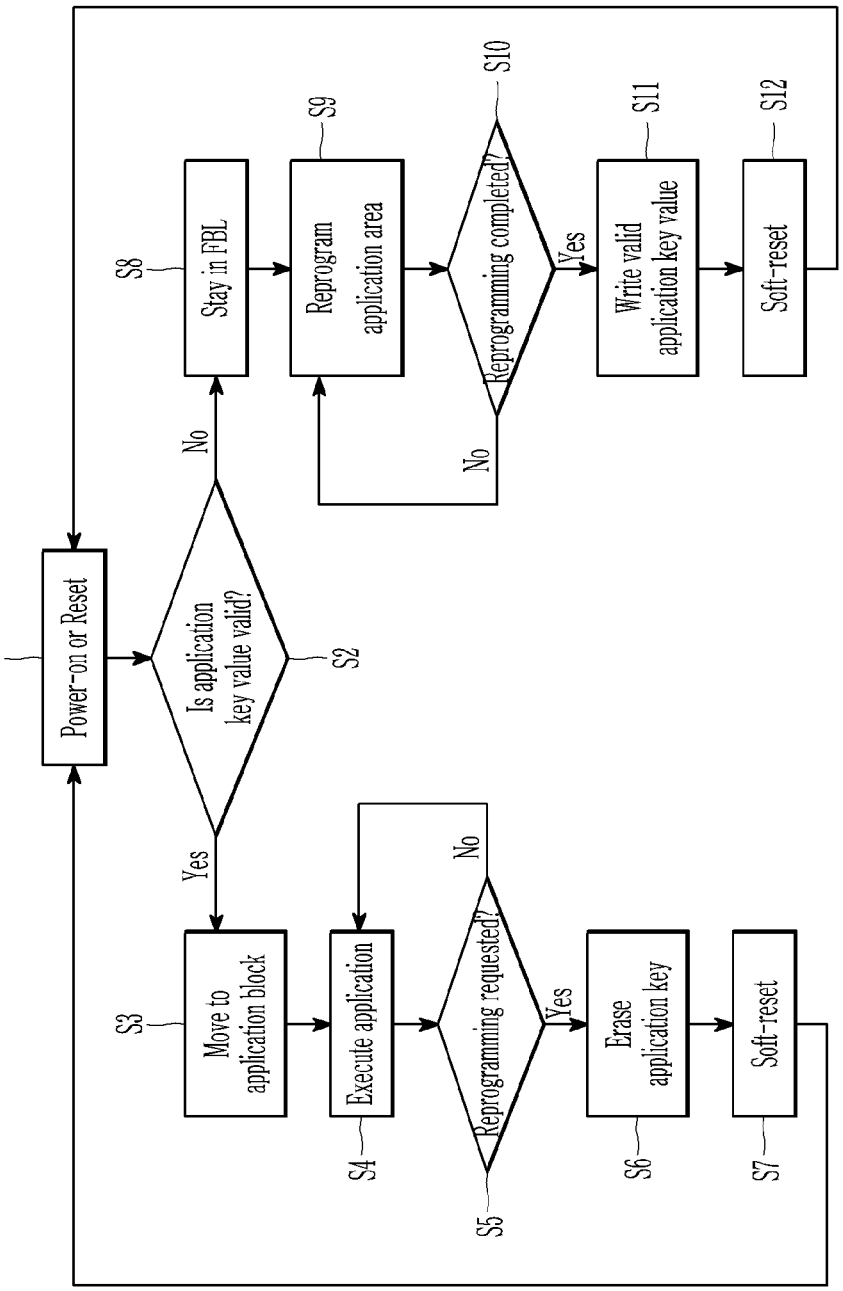
FIG. 3 is a flowchart of a restoring method according to an exemplary embodiment.

FIG. 3 is a flowchart of a restoring method according to an exemplary embodiment.

As shown in FIG. 3, the MCU 1 may be powered on or reset (step S1).

The FBL 21 may determine whether a key value of an application that needs to be operated according to a command of the processor is valid (step S2).

When the key value of the corresponding application is valid as a result of the step S2, the command may be transmitted to the application block 22 from the FBL 21 (step S3).

The application block 22 may perform the corresponding application according to the command (step S4).

During application execution, it may be determined whether there is a reprogramming request (step S5).

When the reprogramming request is transmitted from the processor 3 to the flash memory 2 according to the determination result of step S5, the application key block 23 may erase the key value of the corresponding application (step S6).

After the key value of the application is erased, soft reset may be carried out (step S7). The execution of the application may be stopped due to the soft reset.

When there is no reprogramming request according to the determination result of the step S5, the application execution may be maintained according to the step S4.

After step S7, according to the step S1, the flash memory 2 enters the FBL mode again, and the process may be carried out from the step S2. Then, since the application key value is invalid, the reprogramming is carried out in the FBL mode such that a valid application key value may be written.

When the key value of the application is invalid as a determination result of the step S2, a command may stay in the FBL 21 (step S8). That is, the flash memory 2 enters the FBL mode. In this case, a CPU core exception due to an ECC error may occur.

When the flash memory 2 receives data for reprogramming from the processor 3, the FBL 21 may reprogram an application area (step S9).

The application block 22 may determine whether the reprogramming is completed (step S10).

When it determined that the reprogramming is not completed in the step S10, the execution of the step S9 may be maintained.

When it determined that the reprogramming is completed in the step S10, the application key block 23 may write a valid application key value (step S11).

After the step S11, soft reset may be carried out (step S12). After the soft reset, the flash memory 2 enters the FBL mode according to the step S1 and then the process may be carried out from the step S2 again.

According to the exemplary embodiment of the present disclosure, when the application key value is invalid, a problem of occurrence of infinite repetition between processes of power-on and reading effective key values when the CPU core exception due to an ECC error occurs in the conventional art can be solved by entering the FBL mode where the reprogramming can be performed.

Hereinafter, an exemplary embodiment in which a battery device to which the MCU according to the above-described exemplary embodiment is applied will be described.

Figure 4:
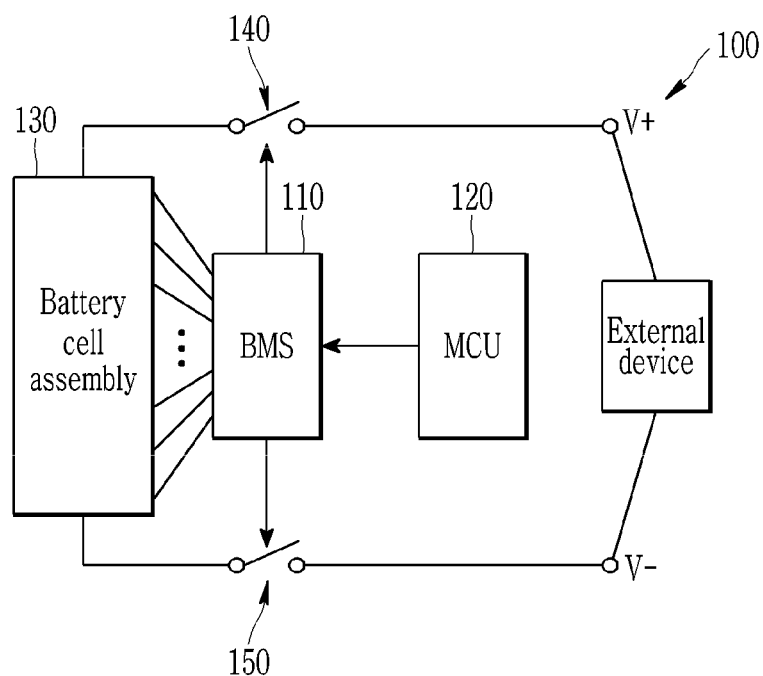
FIG. 4 shows a battery device according to an exemplary embodiment.

FIG. 4 shows a battery device according to an exemplary embodiment.

As shown in FIG. 4, a battery device 100 includes an MCU 120, and the MCU 120 may store a plurality of applications required for battery monitoring and management. The battery device 100 may be driven according to an application executed by the MCU 120. For example, the MCU 120 may include an application for estimating a state of charge and lifespan of a battery pack and state information such as current, voltage, temperature, and the like of the battery pack and battery cell.

Thus, an application for estimation of a state of charge (SOC) of the battery pack may be executed in the MCU 120, and an application for detecting battery state information for estimation of the SOC of the battery pack may be executed.

Operation of the application for estimation of the SOC will now be described.

As shown in FIG. 4, the battery device 100 includes a battery management system (BMS) 110, the micro controller unit (MCU) 120, a battery cell assembly 130, and relays 140 and 150.

The battery cell assembly 130 includes a plurality of battery cells that are electrically connected. A battery module in which a predetermined number of battery cells are connected in series is formed, and a predetermined number of battery modules are connected in series and in parallel such that desired power can be supplied.

Each of the plurality of battery cells that form the battery cell assembly 130 are electrically connected with the BMS 110 through a plurality of wires.

The BMS 110 collects and analyzes various pieces of information related to the battery device that include information on a plurality of battery cells to control charging/discharging of the battery device, battery cell balancing, a protection operation, and the like.

The relays 140 and 150 may be implemented as a relay or an n-channel type of transistor, and are connected in series between the battery cell assembly 130 and an external device. Each of the relays 140 and 150 may operate by a signal supplied from the BMS 110.

The MCU 120 may be implemented according to the above-described exemplary embodiment. When an application is executed in the MCU 120, a control signal according to the application may be transmitted to the BMS 110. Then, the BMS 110 may operate according to the application executed in the MCU 120.

For example, when an SOC estimation application among a plurality of applications stored in the MCU 120 (e.g., stored in the flash memory of the MCU 120) is executed, the BMS 110 estimates a SOC according to the application. An estimation method of the SOC is determined according to the application.

For example, an SOC estimation application may estimate a SOC (hereinafter, referred to as a first SOC) by using a first battery modeling method and may estimate a SOC (hereinafter, referred to as a second SOC) by using a second battery modeling method, and the first battery modelling method and the second battery modeling method may be different from each other. The battery modeling method is one that is used to estimate a state of a battery having a non-linear characteristic, and may include an electrical circuit model, an electrochemical model, an analytical model, and a stochastic model.

Specifically, the BMS 110 may estimate a first SOC at the present stage based on a SOC estimated at the previous stage and information included in battery cell assembly state information by using an electrical circuit model as the first battery modeling method according to the SOC estimation application. As the second battery modeling, an electrochemical model may be used.

The electrical circuit model is a method for modeling input and output characteristics of a battery using an equivalent circuit implemented as an electrical circuit. The electrical circuit model has a merit that an operation process for SOC estimation is relatively simple, so that time required for the operation is not long and the load for the operation is not excessive. However, in the case of such an electrical circuit model, there is a problem that accuracy is somewhat lower.

On the other hand, the electrochemical model is a method for modeling the characteristic of a battery based on a chemical action occurring inside the battery. A representative example of such an electrochemical model is a Doyle-Fuller-Newman (DFN) model. The DFN model may model spatial and temporal changes in the lithium ion concentration present in a porous electrode, potential, intercalation kinetics, and current density between solid and electrolyte solution phases. Such an electrochemical model has a merit of very high accuracy.

The BMS 110 may acquire a highly accurate SOC estimation value (i.e., second SOC) based on state information of a battery cell assembly by using an electrical chemical model such as a DFN model according to the SOC estimation application. In addition, the BMS 110 may increase accuracy of the SOC (first SOC) estimation by reflecting the SOC estimation result (second SOC) with high accuracy according to the SOC estimation application in an input parameter.

For example, the BMS 110 may recognize the second SOC value as a first SOC of the previous stage according to the SOC estimation application, and may estimate a first SOC of the present stage by applying the received state information of the battery cell assembly and the first SOC of the previous stage to the first battery modeling method. Then, the first SOC value can be periodically corrected such that an error in the first SOC estimation can be periodically prevented from increasing, thereby improving accuracy in the SOC estimation.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A microcontroller unit (MCU) comprising non-transitory flash memory,
wherein the flash memory is configured to:
determine a key value of each application among a plurality of applications stored in the flash memory, when the MCU is powered on, and when the key value of the application is invalid, enter a mode that enables reprogramming of the flash memory, wherein the plurality of applications includes a state of charge (SOC) estimation application, and wherein in response to the SOC estimation application being executed in the MCU, the MCU is configured to send a control signal to a battery management system (BMS) to operate based on a SOC estimated by the SOC estimation application.

2. The MCU of claim 1, wherein the flash memory comprises a flash boot loader, an application block, and an application key block, wherein when the MCU is powered on, the flash boot loader is configured to determine an application key value in the application key block, and wherein the mode that enables reprogramming is a flash boot loader mode.

3. The MCU of claim 2, wherein the application block is configured to reprogram received application data in the flash boot loader mode.

4. The MCU of claim 3, wherein the application key block is configured to write a valid application key value after completion of the reprogramming.

5. The MCU of claim 1, wherein the flash memory is configured to, when receiving a reprogramming request, erase a key value of the application that corresponds to the reprogramming request and enter the mode.

6. The MCU of claim 5, wherein the flash memory is configured to reprogram received application data and write an application key value in the mode.

7. An error restoring method of a microcontroller unit (MCU) that includes non-transitory flash memory, the flash memory including a flash boot loader, an application block, and an application key block, the method comprising:

when the MCU is powered on, determining, by the flash boot loader, an application key value in the application key block; and when the application key value is invalid in the determining of the application key value, entering a flash boot loader mode for enabling reprogramming of the flash memory, wherein the flash memory is configured to store a plurality of applications, wherein the plurality of applications includes a state of charge (SOC) estimation application, and wherein in response to the SOC estimation application being executed in the MCU, the MCU sends a control signal to a battery management system (BMS) to operate based on a SOC estimated by the SOC estimation application.

8. The error restoring method of the MCU of claim 7, further comprising:

reprogramming received application data; and writing a valid application key value after completion of the reprogramming.

9. The error restoring method of the MCU of claim 7, further comprising:

in the determining of the application key value, executing a corresponding application when the application key value is valid;

receiving a reprogramming request during execution of the corresponding application; and erasing a key value of the corresponding application when receiving the reprogramming request.

10. The error restoring method of the MCU of claim 9, wherein, after erasing the application key value, the error restoring method is performed from the determining of the application key value in the application key block, by the flash boot loader.

11. A battery device, comprising:

a battery cell assembly including a plurality of battery cells that are electrically connected to each other;

a micro controller unit (MCU) that includes non-transitory flash memory, the flash memory being configured to store an application for battery management of the battery cell assembly; and a battery management system (BMS) that performs the battery management according to the application executed by the MCU, wherein when the MCU is powered on, the flash memory is configured to determine a key value of the application, wherein when the key value of the application is invalid, the flash memory is configured to enter a mode that enables reprogramming of the flash memory, wherein the flash memory is configured to store a plurality of applications, wherein the plurality of applications includes a state of charge (SOC) estimation application, and wherein in response to the SOC estimation application being executed in the MCU, the MCU is configured to send a control signal to a battery management system (BMS) based on a SOC estimated by the SOC estimation application.

* * * * *